(12) United States Patent
You et al.

(10) Patent No.: US 9,139,226 B2
(45) Date of Patent: Sep. 22, 2015

(54) METHOD, APPARATUS, AND SYSTEM FOR PARKING CONTROL

(71) Applicant: Mando Corporation, Pyeongtaek-si, Gyeonggi-do (KR)

(72) Inventors: Kwan Sun You, Yongin-si (KR); Jae Suk Kim, Yongin-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 267 days.

(21) Appl. No.: 13/645,381

(22) Filed: Oct. 4, 2012

(65) Prior Publication Data

US 2013/0085636 A1 Apr. 4, 2013

(30) Foreign Application Priority Data

Oct. 4, 2011 (KR) .................. 10-2011-0100502

(51) Int. Cl.
| | | |
|---|---|---|
| *G01C 22/00* | (2006.01) | |
| *G05D 1/00* | (2006.01) | |
| *B62D 15/02* | (2006.01) | |
| *B60W 30/06* | (2006.01) | |
| *B60Q 1/48* | (2006.01) | |
| *B60W 50/00* | (2006.01) | |

(52) U.S. Cl.
CPC .............. *B62D 15/027* (2013.01); *B60W 30/06* (2013.01); *B60Q 1/48* (2013.01); *B60W 2050/0075* (2013.01)

(58) Field of Classification Search
CPC ........ G08G 1/14; B60T 2201/10; B60Q 1/48; B62D 15/027
USPC ............. 701/25, 41; 340/932.2; 348/118, 148
See application file for complete search history.

(56) References Cited

U.S. PATENT DOCUMENTS

| | | | | |
|---|---|---|---|---|
| 7,639,841 | B2 * | 12/2009 | Zhu et al. ...................... | 382/104 |
| 7,737,866 | B2 * | 6/2010 | Wu et al. ..................... | 340/932.2 |
| 2006/0139181 | A1 * | 6/2006 | Danz et al. ................. | 340/932.2 |
| 2009/0243888 | A1 * | 10/2009 | Kawabata et al. ......... | 340/932.2 |
| 2010/0228426 | A1 * | 9/2010 | Suzuki et al. .................. | 701/29 |

FOREIGN PATENT DOCUMENTS

| | | |
|---|---|---|
| CN | 101816175 A | 8/2010 |
| DE | 10 2007 002 261 A1 | 8/2008 |
| DE | 10 2007 002 262 A1 | 8/2008 |
| EP | 0 835 796 A2 | 4/1998 |
| JP | 2002-240661 A | 8/2002 |

* cited by examiner

*Primary Examiner* — Tuan C. To
*Assistant Examiner* — Isaac Smith
(74) *Attorney, Agent, or Firm* — McDermott Will & Emery LLP

(57) ABSTRACT

Disclosed is an a method, an apparatus, and a system for getting a peripheral situation to automatically determine a parking mode, and helping recognize an obstacle more accurately by using a camera in addition to an ultrasonic sensor, thereby allowing a safe and accurate parking control.

8 Claims, 10 Drawing Sheets

(A) RIGHT RIGHT-ANGLE PARKING MODE (B) LEFT RIGHT-ANGLE PARKING MODE (C) RIGHT PARALLEL PARKING MODE (D) LEFT PARALLEL PARKING MODE

METHOD, APPARATUS, AND SYSTEM FOR PARKING CONTROL

CROSS-REFERENCE TO RELATED APPLICATION

This application claims priority from and the benefit under 35 U.S.C. §119(a) of Korean Patent Application No. 10-2011-0100502, filed on Oct. 4, 2011, which is hereby incorporated by reference for all purposes as if fully set forth herein.

BACKGROUND OF THE INVENTION

1. Field of the Invention

The present invention relates to parking control.

2. Description of the Prior Art

According to the related art, after pressing a parking control switch for starting a parking control, a driver repeatedly manipulates a parking mode selection switch several times while visually considering the surrounding situation, to select a desired parking mode from various types of parking modes. This causes the driver to manipulate the parking mode selection switch several times to determine a parking mode.

Further, in the parking control according to the related art, there are many restrictions on recognition of obstacles only by using an ultrasonic sensor, causing problems in an accuracy and a safety of the parking control. For example, due to the restrictions, a type of an obstacle (a parked vehicle, and an obstacle other than a vehicle, such as a column and a wall) may not be discerned. In addition, an accuracy and a safety of parking control may deteriorate due to restrictions by which a front surface or a rear surface of a parked vehicle cannot be discerned as an obstacle.

SUMMARY OF THE INVENTION

Accordingly, the present invention has been made to solve the above-mentioned problems occurring in the prior art, and an object of the present invention is to provide a method, an apparatus, and a system for parking control which can detect a peripheral situation to automatically determine a parking mode only if a driver presses a parking control switch for starting a parking control once, thereby eliminating a parking mode selection switch and solving an inconvenience of manipulation for selection of a parking mode by the driver.

It is another object of the present invention to provide a method, an apparatus, and a system for parking control which can overcome restrictions of ultrasonic sensors by additionally using a camera in addition to the ultrasonic sensors, thereby allowing obstacles to be recognized more accurately and performing a parking control more safely and accurately In order to accomplish this object, there is provided a parking control apparatus including: a parking control start signal input unit for receiving a parking control start signal through a parking control switch; a detection unit control unit for controlling such that, if the parking control start signal is input, while a vehicle is moving, a left area and a right area are detected through a left ultrasonic sensor and a right ultrasonic sensor and a left image for the left area and a right image for the right area are photographed through at least one camera; and a parking mode determining unit for judging whether an available parking area is located on the left or right side of the vehicle and whether the vehicle is to be parked at a right angle or in parallel based on left ultrasonic data and the left image for the left area and right ultrasonic data and the right image for the right area, and determining a parking mode for parking the vehicle in the parking area according to the judging result.

In accordance with another aspect of the present invention, there is provided a parking control method provided by a parking control apparatus, the parking control method including: receiving a parking control start signal through a parking control switch; controlling such that, if the parking control start signal is input, while a vehicle is moving, a left area and a right area are detected through a left ultrasonic sensor and a right ultrasonic sensor and a left image for the left area and a right image for the right area are photographed through at least one camera; and judging whether an available parking area is located on the left or right side of the vehicle and whether the vehicle is to be parked at a right angle or in parallel based on left ultrasonic data and the left image for the left area and right ultrasonic data and the right image for the right area, and determining a parking mode for parking the vehicle in the parking area according to the judging result.

In accordance with still another aspect of the present invention, there is provided a parking control system including: a parking control switch for receiving a parking control start signal; a plurality of detection units for detecting a periphery of the vehicle while the vehicle is moving according to an input of the parking control start signal; and a parking control unit for judging whether an available parking area is located on the left or right side of the vehicle and whether the vehicle is to be parked at a right angle or in parallel in the parking area based on detection results input from the plurality of detection units, determining a parking mode for parking the vehicle in the parking area according to the judging result, and performing a parking control such that the vehicle is moved to be parked in the parking area according to the determined parking mode.

In accordance with yet another aspect of the present invention, there is provided a parking control apparatus including: a parking control start signal input unit for receiving a parking control start signal through a parking control switch; a detection result input unit receiving a detection result detected for a peripheral area of a vehicle through a plurality of detection units; and a parking mode determining unit for judging whether an available parking area is located on the left or right side of the vehicle and whether the vehicle is to be parked at a right angle or in parallel in the parking area based on the input detection results, and determining a parking mode for parking the vehicle in the parking area according to the judging result.

As described above, the present invention can detect a peripheral situation to automatically determine a parking mode only if a drive presses a parking control switch for starting a parking control once, thereby eliminating a parking mode selection switch and solving an inconvenience of manipulation for selection of a parking mode by the driver.

Further, the present invention can overcome restrictions of ultrasonic sensors by additionally using a camera in addition to the ultrasonic sensors, thereby allowing obstacles to be recognized more accurately and performing a parking control more safely and accurately.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
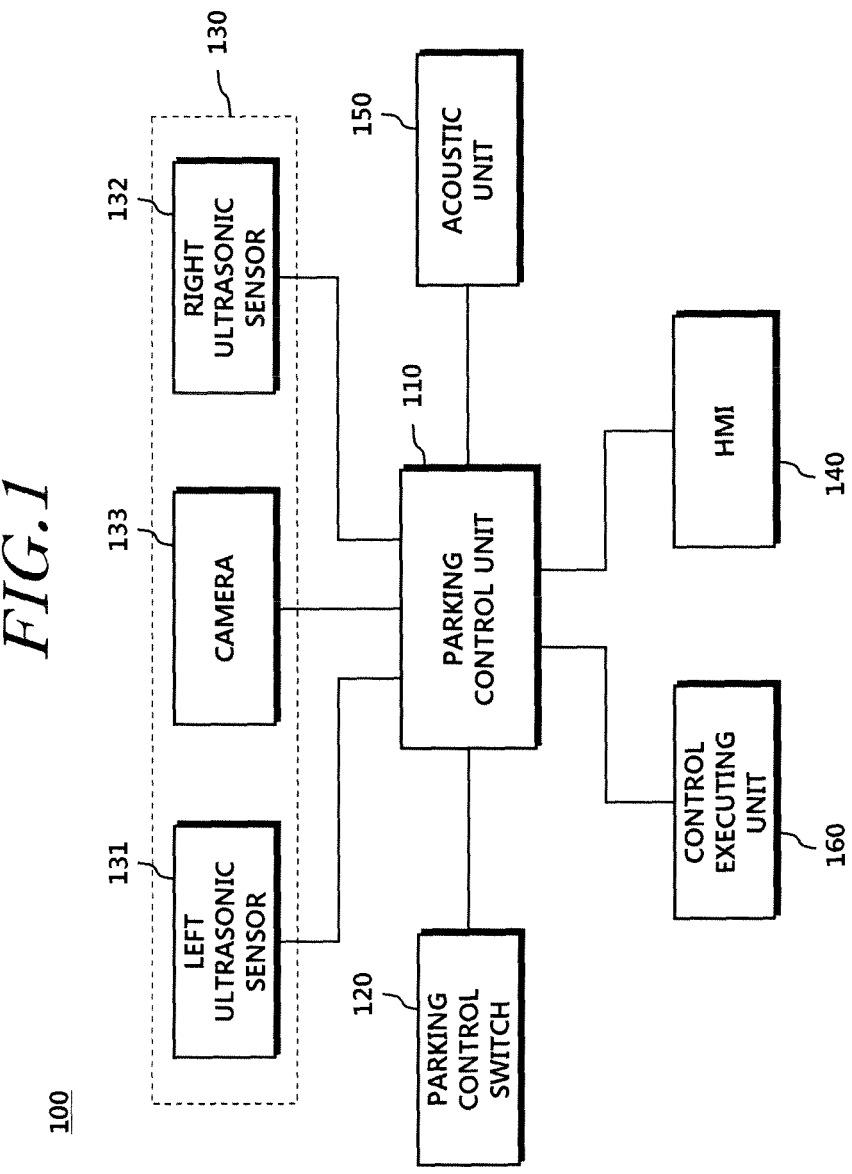
FIG. 1 is a view illustrating a parking control system according to an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a view illustrating a parking control system 100 according to an embodiment of the present invention.

Referring to FIG. 1, the parking control system 100 according to the embodiment of the present invention includes a parking control switch 120 for receiving a parking control start signal, a plurality of detection units 130 for detecting a periphery of the vehicle while the vehicle is moving according to an input of the parking control start signal from the parking control switch 120, and a parking control unit 110 for judging whether an available parking area is located on the left or right side of the vehicle and whether the vehicle is to be parked at a right angle or in parallel in the parking area based on detection results input from the plurality of detection units 130, determining a parking mode for parking the vehicle in the parking area according to the judging result, and performing a parking control such that the vehicle is moved to be parked in the parking area according to the determined parking mode.

Referring to FIG. 1, the parking control system 100 according to the embodiment of the present invention may include, in addition to the parking control unit 110 for performing a parking control on the whole, the parking control switch 120, and the plurality of detection units 130, a human machine interface 140 for providing various interfaces such as a driver input and an output of a message related to parking control and an acoustic unit 150 for outputting a buzzer sound, an alarm sound, or a guide voice related to parking control.

The parking control system 100 according to the embodiment of the present invention may further include a control executing unit 160 for allowing the vehicle to behave according to a parking control by the parking control unit 110. The control executing unit 160 may include a steering unit and a brake unit.

The above-described parking control unit 110 may be realized by an electronic control unit (ECU).

The plurality of detection units 130 may include at least two ultrasonic sensors 131 and 132. For example, the plurality of detection units 130 may include a left ultrasonic sensor 131 mounted to the left side of the vehicle and a right ultrasonic sensor 132 mounted to the right side of the vehicle.

The plurality of detection units 130 may further include a camera 133, in addition to the at least two ultrasonic sensor 131 and 132. The camera 133 may serve to compensate for an inaccurate part in recognition of an obstacle through the left ultrasonic sensor 131 or the right ultrasonic sensor 132.

Figure 2:
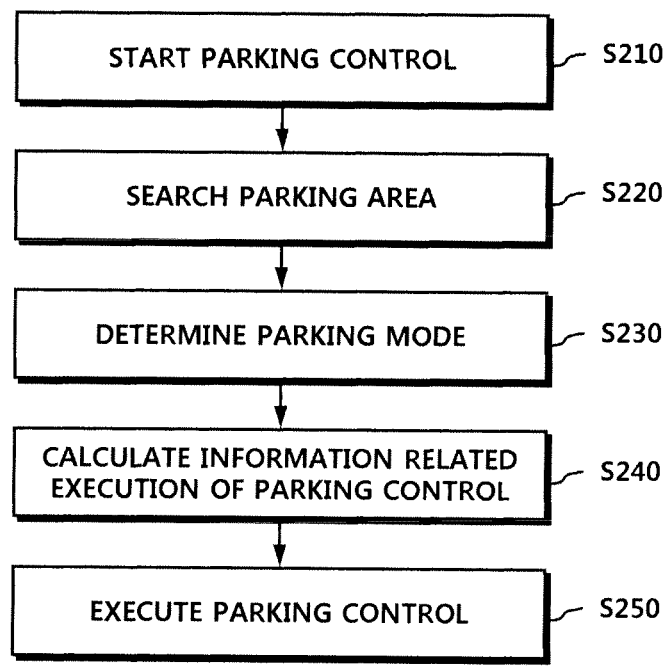
FIG. 2 is a view illustrating a parking control procedure according to an embodiment of the present invention.

FIG. 2 is a view schematically illustrating a parking control procedure by the parking control system according to the embodiment of the present invention.

Referring to FIG. 2, the parking control procedure according to the embodiment of the present invention includes a parking control starting step S210, a parking area searching step S220, a parking mode determining step S230, a parking control execution related information calculating step S240, and a parking control executing step S250.

The parking control starting step S210 is a step of starting a parking control according to a manipulation of the parking control switch 120 by a driver. In a parking control according to the related art, a driver selects a parking mode through several switch manipulations in this step.

The parking area searching step S220 is a step of recognizing an obstacle around the vehicle by using the plurality of detection units 130 while the vehicle is moving to an available parking area, recognizing the existence of an available parking area, and obtaining various information on the parking area.

Here, various information (a detection result from the plurality of detection units 130) on the parking area may include information which can be obtained by analyzing ultrasonic data, and may further include information which can be obtained by analyzing an image.

The information which can be obtained by analyzing ultrasonic data may include, for example, information on a distance between the vehicle and an obstacle, a distance between obstacles, and a size of the parking area.

The information which can be obtained by analyzing an image may include, for example, a type of an obstacle, and classification of a side surface and a front surface (or rear surface) of the obstacle. The parking mode determining step S230 is a step of judging whether the parking area is located on the left or right side of the vehicle by using various information (detection result) obtained in the parking area searching step S220, and judging whether the vehicle is to be parked at a right angle or in parallel to determine a parking mode through combination of the judging results.

The parking control execution related information calculating step S240 is a step of calculating various information on how the parking control such as a control of the behavior of the vehicle is executed to park the vehicle in the parking area according to the determined parking mode.

For example, in the parking control execution related information calculating step S240, a target parking location may be calculated based on various information on the parking area obtained in the parking area searching step S220, a parking path for moving the vehicle to the target parking location is calculated at a point where the parking area searching step S220 is completed, and steering control information, gear change control information, and brake control information, and the like may be calculated so that the vehicle is moved along the calculated parking path.

The parking control executing step S250 is a step of controlling the behavior of the vehicle such that the vehicle is actually moved along the parking path by using various information calculated in the parking control execution related information calculating step S240. Then, instruction signals may be transferred to the steering unit, the traveling unit, the brake unit, and the like by using various information calculated in the parking control execution related information calculating step S240.

Figure 3:
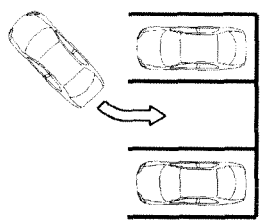
FIG. 3 is a view illustrating parking mode types for parking control according to an embodiment of the present invention.
Figure 3:
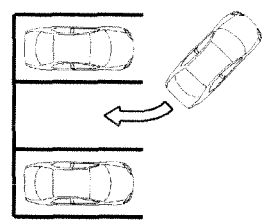
Figure 3:
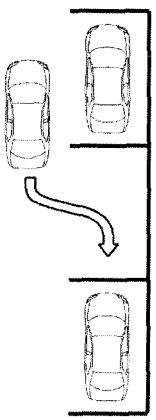
Figure 3:
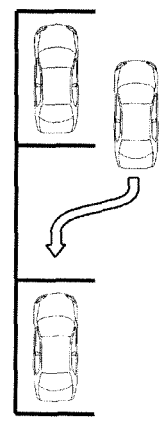

The parking control according to the embodiment of the present invention may support various types of parking modes, and for example, as illustrated in FIG. 3, may include a right right-angle parking mode (a), a left right-angle parking mode (b), a right parallel parking mode (c), and a left parallel parking mode (d).

According to the related art, after pressing the parking control switch 120 for starting a parking control, a driver repeatedly manipulates a parking mode selection switch several times while visually considering the surrounding situation, to select a desired parking mode from various types of parking modes. This causes the driver to manipulate the parking mode selection switch several times to determine a parking mode.

In contrast, according to the present invention, if a driver presses the parking control switch 120 for starting a parking control once, a parking mode is automatically determined after the surrounding situation is detected, and thus a parking mode selection switch is unnecessary and an inconvenience of manipulation by the driver for selection of a parking mode can be solved.

Further, in the parking control according to the related art, there are many restrictions on recognition of obstacles only by using an ultrasonic sensor. For example, due to the restrictions, a type of an obstacle (a parked vehicle, and an obstacle other than a vehicle, such as a column and a wall) may not be discerned or a front surface and a rear surface of the parked vehicle as an obstacle may not be discerned.

However, since the present invention additionally uses the camera 133, such restrictions of the ultrasonic sensor can be overcome, helping recognize an obstacle more accurately and providing a safer and more accurate parking control.

Hereinafter, the parking control apparatus 110 for performing an overall parking control in the parking control system 100 according to the embodiment of the present invention will be described in more detail. Meanwhile, an embodiment in which the plurality of detection units 130 includes the left ultrasonic sensor 131, the right ultrasonic sensor 132, and the at least one camera 133 will be described herein below.

Figure 4:
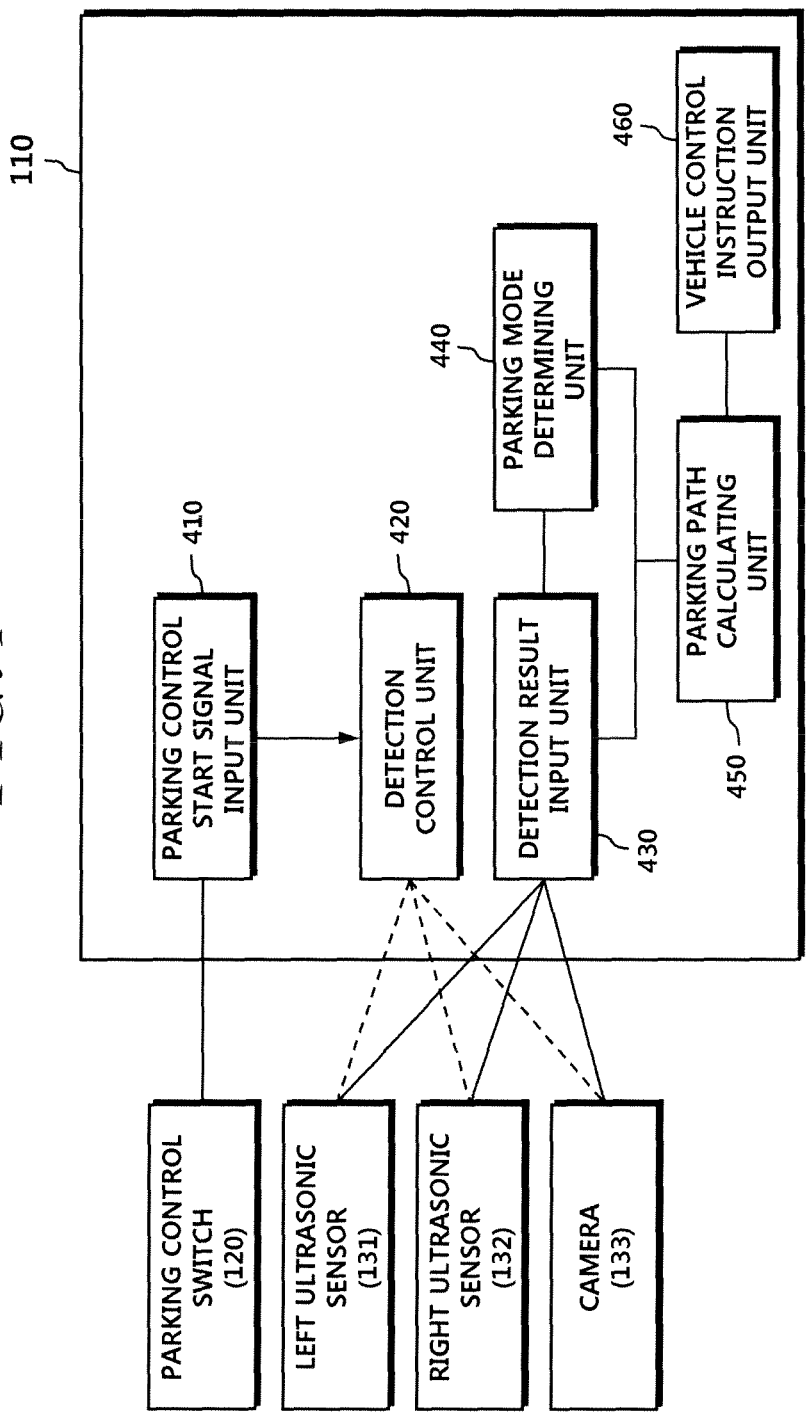
FIG. 4 is a block diagram illustrating a parking control apparatus according to an embodiment of the present invention.

FIG. 4 is a block diagram illustrating the parking control apparatus 110 according to the embodiment of the present invention.

Referring to FIG. 4, the parking control apparatus 110 according to the embodiment of the present invention includes a parking control start signal input unit 410 for receiving a parking control start signal through a parking control switch 120, a detection control unit 420 for controlling such that, if the parking control start signal is input, while a vehicle is moving, a left area and a right area are detected through a left ultrasonic sensor 131 and a right ultrasonic sensor 132 and a left image for the left area and a right image for the right area are photographed through at least one camera 133, and a parking mode determining unit 440 for judging whether an available parking area is located on the left or right side of the vehicle and whether the vehicle is to be parked at right angle or in parallel based on left ultrasonic data and the left image for the left area and right ultrasonic data and the right image for the right area, and determining a parking mode for parking the vehicle in the parking area according to the judging result.

Here, the detection control unit 410 is defined as the unit for controlling the detection units(ex. left and right ultrasonic sensors, at least one camera).

The parking mode determining unit 440 acquires information on a distance between the vehicle and an obstacle in the left area from the left ultrasonic data and recognizes existence of an obstacle in the left area and a type of the obstacle through an image analysis of the left image to judge whether the parking area is located on the left side of the vehicle, and acquires information on a distance between the vehicle and an obstacle in the right area from the right ultrasonic data and recognizes existence of an obstacle in the right area and a type of the obstacle through an image analysis of the right image to judge whether the parking area is located on the right side of the vehicle If it is determined that parking areas are located on both the left and right sides of the vehicle, for example, after a size (for example, an entrance width of the parking area) of a parking area located on the left side is calculated from a distance between obstacles through the left ultrasonic data and a size of a parking area located on the right side is calculated from a distance between obstacles through the right ultrasonic data, the size of the parking area located on the left side and the size of the parking area located on the right side are compared with each other so that the larger parking area can be determined as a parking area in which the vehicle is to be parked.

When the parking area is located on the left side of the vehicle, the parking mode determining unit 440 may acquire information on a size of the parking area from the left ultrasonic data and recognize existence of an obstacle in the left area, a type of the obstacle, and a state of the obstacle through an image analysis of the left image to judge whether the vehicle is to be parked at a right angle or in parallel in the parking area.

Further, when the parking area is located on the right side of the vehicle, the parking mode determining unit 440 may acquire information on a size of the parking area from the right ultrasonic data and recognize existence of an obstacle in the right area, a type of the obstacle, and a state of the obstacle through an image analysis of the right image to judge whether the vehicle is to be parked at a right angle or in parallel in the parking area.

In order to judge whether an available parking area is located on the left or right side of the vehicle and whether the vehicle is to be parked at a right angle or in parallel, during an image analysis of the left image and the right image, the parking mode determining unit 440 may set a region of interest (ROI) having a predetermined size in the corresponding image, extract an edge component from an image corresponding to the set ROI, acquire obstacle contour information based on the extracted edge component, and recognize at least one of existence of an obstacle, a type of the obstacle (for example, a parked vehicle and an obstacle which is not a vehicle), and a state of the obstacle (for example, a parking state of a parked vehicle, that is, a right angle parking state, a parallel parking state, a front parking state, and a rear parking state) based on the acquired obstacle contour information.

The parking mode determining unit 440 compares various obstacle shape information stored in advance with the acquired obstacle contour information through a learning algorithm such as Adaboost Algorithm to recognize existence of an obstacle, a type of the vehicle, a state of the vehicle more accurately.

The parking mode determining unit 440 finally determines a parking mode after determining whether an available parking area is located on the left or right side of the vehicle and whether the vehicle is to be parked at a right-angle or in parallel. Then, if the parking area is judged to be located on the left side of the vehicle and the vehicle is to be parked at a right angle in the parking area, the parking mode determining unit 440 may determine a left right-angle parking mode as the parking mode, if the parking area is judged to be located on the right side of the vehicle and the vehicle is to be parked at a right angle in the parking area, the parking mode determining unit 440 may determine a right right-angle parking mode as the parking mode, if the parking area is judged to be located on the left side of the vehicle and the vehicle is to be parked in parallel in the parking area, the parking mode determining unit 440 may determine a left parallel parking mode as the parking mode, and if the parking area is judged to be located on the right side of the vehicle and the vehicle is to be parked in parallel in the parking area, the parking mode determining unit 440 may determine a right parallel parking mode as the parking mode.

As illustrated in FIG. 4, the parking control apparatus 110 may further include a parking path calculating unit 450 for calculating a parking path along which the vehicle is moved to be parked, according to the determined parking mode based on the information obtained by analyzing the ultrasonic data input through the ultrasonic sensor 131 and 132 and the information obtained by analyzing an image photographed through the camera 133, and a vehicle control instruction output unit 460 for outputting a vehicle control instruction for moving the vehicle along the parking path.

Figure 5:
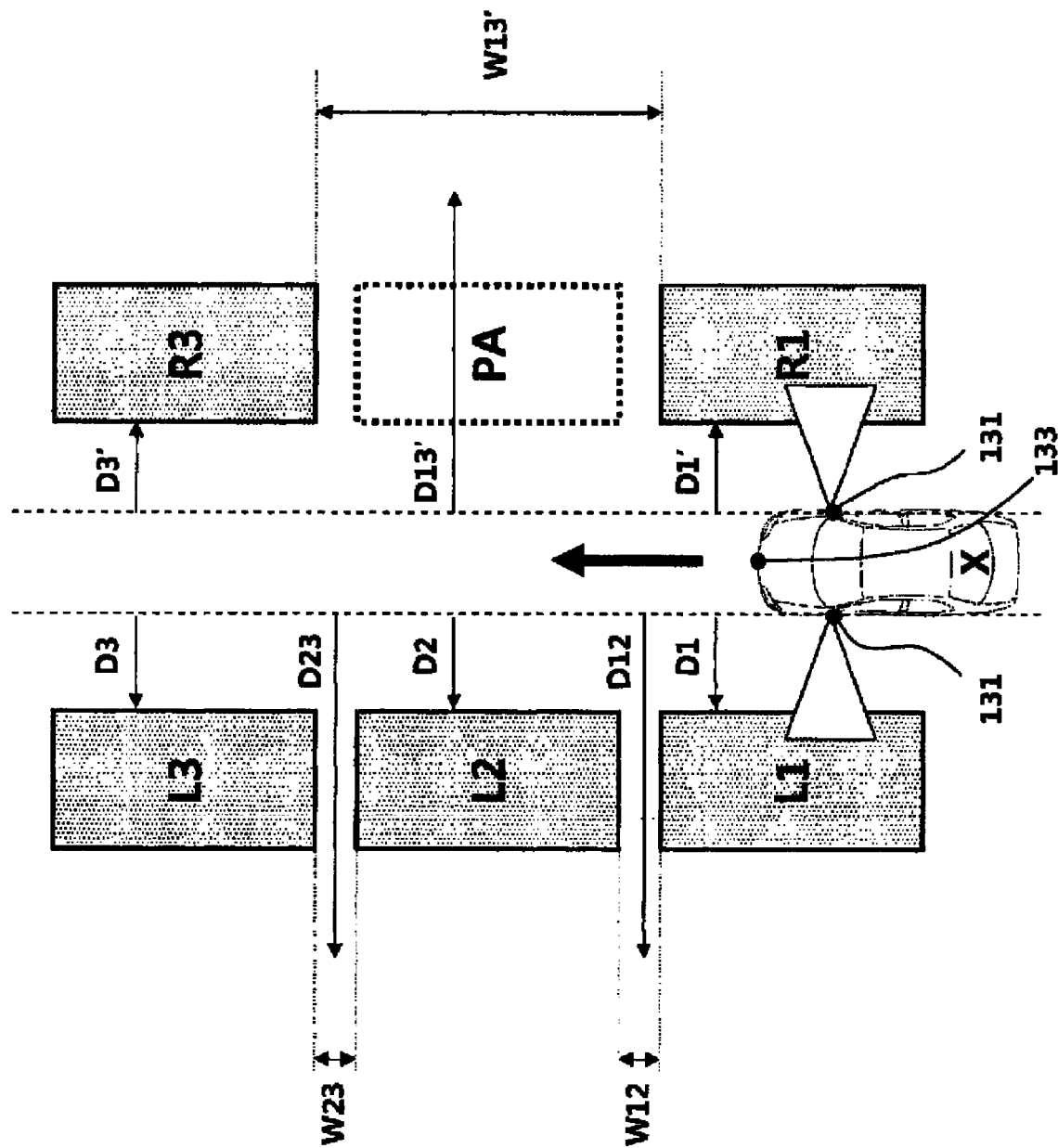
FIG. 5 is an exemplary view illustrating that the parking control apparatus according to the embodiment of the present invention determines a parking mode.

FIG. 5 is an exemplary view illustrating that the parking control apparatus 110 according to the embodiment of the present invention determines a parking mode.

FIG. 5 is a view illustrating a process where the parking control unit 110 mounted to the vehicle X detects a periphery of the vehicle X by using the left ultrasonic sensor 131, the right ultrasonic sensor 132, and the camera 133, recognizes an area between two obstacles R1 and R3 located on the right side as a parking area PA, and determines a right parallel parking mode for parking the vehicle X in the recognized right parking area PA as a final parking mode.

If a driver presses the parking control switch 120, a parking control is started, and while the vehicle X is moving between the left obstacles L1, L2, and L3 and the right obstacles R1 and R3 in an arrow direction, the left ultrasonic sensor 131 and the right ultrasonic sensor 132 detect the left area and the right area, and the camera 133 photographs the left area and the right area.

If the vehicle X passes by points where the final left obstacle L3 and the final right obstacle R3 are located, by a predetermined distance, the vehicle X stops moving, and the parking control unit 110 receives left ultrasonic data and right ultrasonic data from the left ultrasonic sensor 131 and the right ultrasonic sensor 132, respectively, and receives a left image and a right image from the camera 133.

The parking control unit 110 may analyze the left ultrasonic data and the right ultrasonic data (for example, analysis of a signal intensity change), and may calculate distance values D1, D12, D2, D23, D3, D1', D13', and D3' between a location where an obstacle is estimated to exist and the vehicle X.

The parking control unit 110 may analyze the left ultrasonic data and the right ultrasonic data (for example, analysis of a signal intensity change), and may calculate interval values W12, W23, and W13' between obstacles estimated to exist.

The parking control unit 110 may analyze the left ultrasonic data and the right ultrasonic data (for example, analysis of a signal intensity change), and may calculate a length of an obstacle. That is, a length of a section where a distance value is constantly maintained as D3 may be calculated as a length of the obstacle.

When the calculated distance values D1, D12, D23, D3, D1', D13', D3' are compared with each other, the parking control unit 110 may confirm that D1, D2, D3, D1', and D3' have similar sizes in a predetermined range, and D12, D23, and D13' are larger than D1, D2, D3, D1', and D3' by more than a predetermined value (for example, a vehicle width (2.3 M)) or are a maximum set value.

When the calculated interval values W12, W23, and W13' are compared with each other, the parking control unit 110 may confirm that W12 and W23 have similar sizes within a predetermined range, and W13' is larger than W12 and W23 and is more than a predetermined value (for example, a vehicle length (4.5 M)).

Thus, the parking control unit 110 may judge that an area between the left obstacles L1 and L2 and an area between the left obstacles L2 and L3 is not a parking area PA where the vehicle X can be parked, and an area between the right obstacles R1 and R3 is a parking area PA where the vehicle X can be parked, thereby judging that the parking area PA is located on the right side of the vehicle X.

The parking control unit 110 may judge that parallel parking is possible from the fact that the determined size (for example, an entrance width W13' is more than a predetermined value (for example: a vehicle length (4.5 M)) of the determined parking area PA.

The judged parking area PA may be an area where one vehicle can be parked, and if the right obstacles R1 and R3 are vehicles parked at a right angle, the determined parking area PA may be an area where two vehicles can be parked at a right angle.

Thus, in order to accurately classify them, a right image photographed through the camera 133 may be analyzed to recognize types and states of the right obstacles R1 and R3, and it may be determined that the right obstacles R1 and R3 are vehicles parked in parallel. Accordingly, the judged parking area PA may be classified as an area where one vehicle can be parked in parallel.

Through the above-described process, the parking control unit 110 finally determines the right parallel parking mode as the parking mode.

Figure 6:
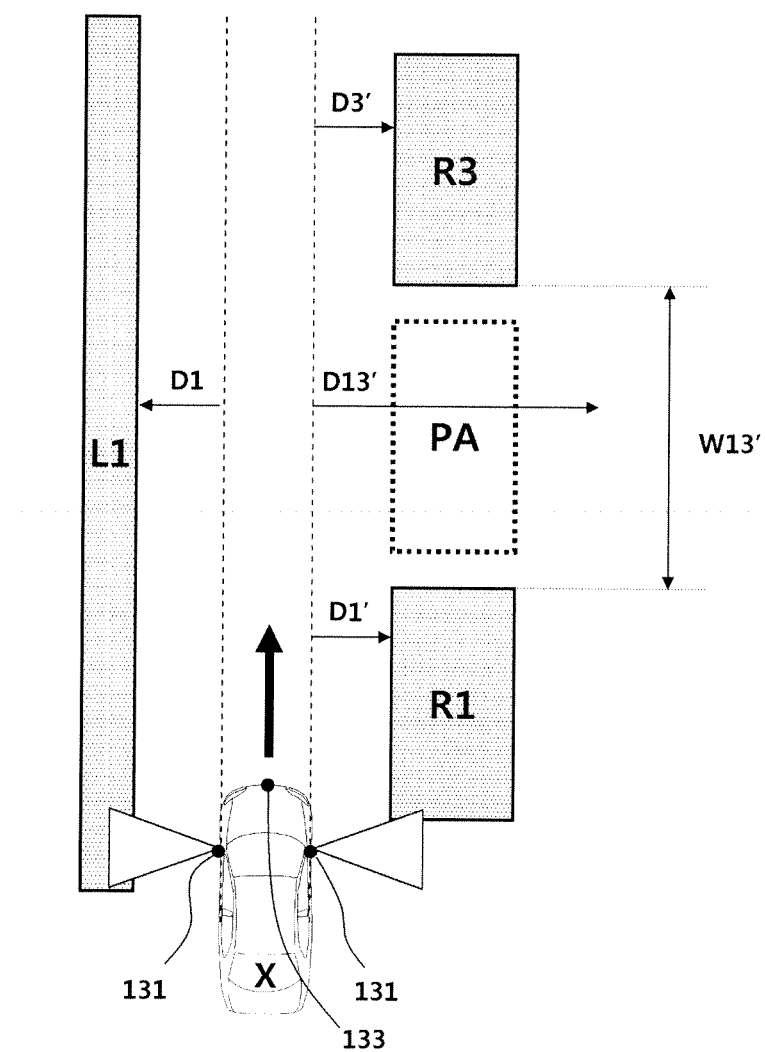
FIG. 6 is another exemplary view illustrating that the parking control apparatus according to the embodiment of the present invention determines a parking mode.

FIG. 6 is another exemplary view illustrating that the parking control apparatus 110 according to the embodiment of the present invention determines a parking mode.

FIG. 6 is the same as FIG. 5 except that the left obstacle L1 is a wall. Even in this case, as a distance value from the left obstacle L1 is constant as D1, it is judged that a parking area is not present in the left area, and an area between the right obstacles R1 and R3 in the right area is determined to be a parking area PA.

Figure 7:
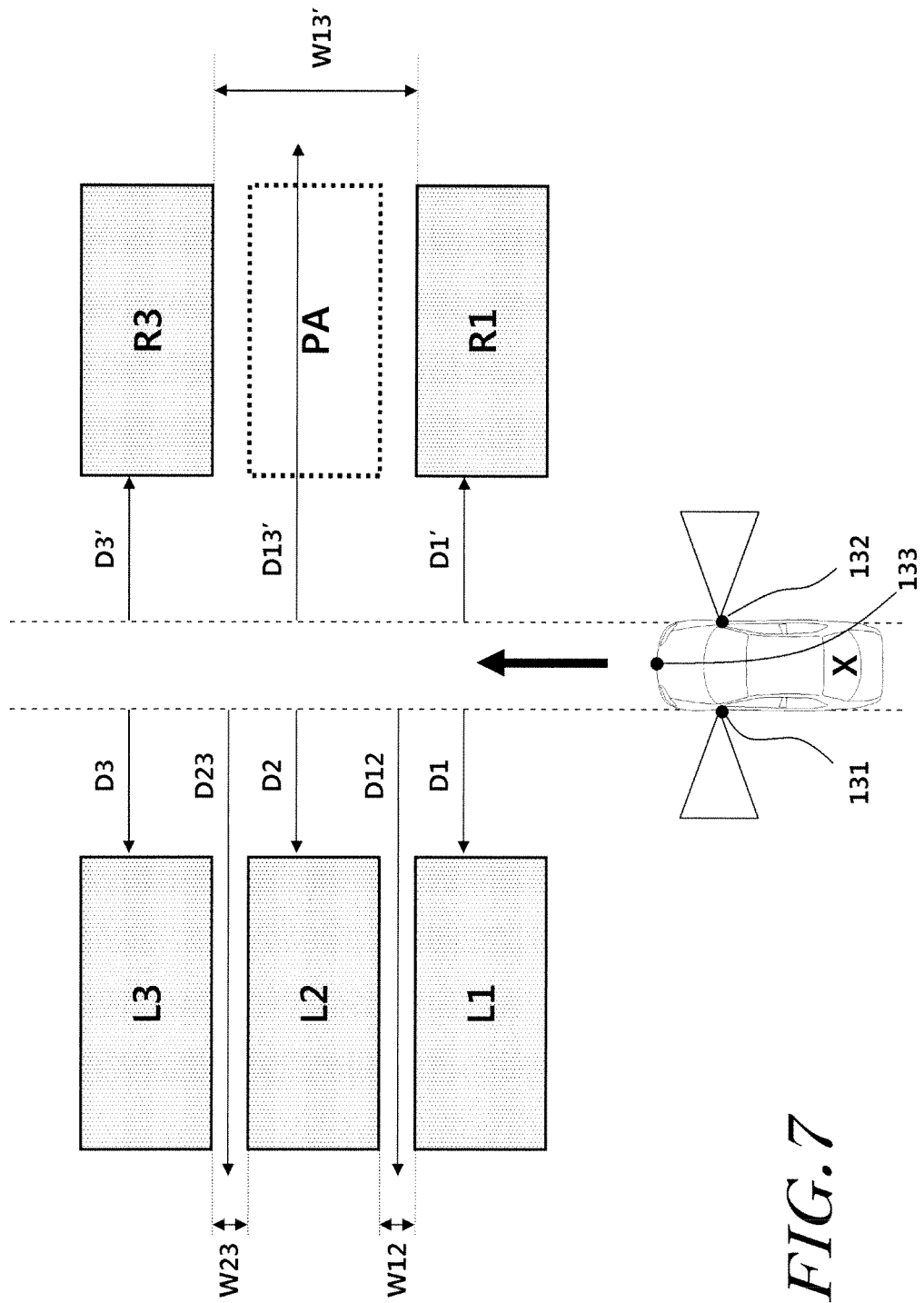
FIG. 7 is another exemplary view illustrating that the parking control apparatus according to the embodiment of the present invention determines a parking mode.

FIG. 7 is another exemplary view illustrating that the parking control apparatus 110 according to the embodiment of the present invention determines a parking mode.

FIG. 7 is a view illustrating a process where the parking control unit 110 mounted to the vehicle X detects a periphery of the vehicle X by using the left ultrasonic sensor 131, the right ultrasonic sensor 132, and the camera 133, recognizes an area between two obstacles R1 and R3 located on the right side as a parking area PA, and determines a right right-angle parking mode for parking the vehicle X in the recognized right parking area PA as a final parking mode.

If a driver presses the parking control switch 120, a parking control is started, and while the vehicle X is moving between the left obstacles L1, L2, and L3 and the right obstacles R1 and R3 in an arrow direction, the left ultrasonic sensor 131 and the right ultrasonic sensor 132 detect the left area and the right area, and the camera 133 photographs the left area and the right area.

When the vehicle X passes by a point where the final left obstacle L3 and the final right obstacle R3 by a predetermined distance, the vehicle X stops moving, and the parking control unit 110 receives left ultrasonic data and right ultrasonic data from the left ultrasonic sensor 131 and the right ultrasonic sensor 132, respectively, and receives a left image and a right image from the camera 133.

The parking control unit 110 may analyze the left ultrasonic data and the right ultrasonic data (for example, analysis of a signal intensity change), and may calculate distance values D1, D12, D2, D23, D3, D1', D13', and D3' between a location where an obstacle is estimated to exist and the vehicle X.

The parking control unit 110 may analyze the left ultrasonic data and the right ultrasonic data (for example, analysis of a signal intensity change), and may calculate interval values W12, W23, and W13' between obstacles estimated to exist.

When the calculated distance values D1, D12, D2, D23, D3, D1', D13', D3' are compared with each other, the parking control unit 110 may confirm that D1, D2, D3, D1', and D3' have similar sizes in a predetermined range, and D12, D23, and D13' are larger than D1, D2, D3, D1', and D3' by more than a predetermined value (for example, a vehicle length (4.5 M)) or are a maximum set value.

When the calculated interval values W12, W23, and W13' are compared with each other, the parking control unit 110 may confirm that W12 and W23 have similar sizes within a predetermined range, and W13' is larger than W12 and W23 and is more than a predetermined value (for example, a vehicle width (2.3 M)).

Thus, the parking control unit 110 may judge that an area between the left obstacles L1 and L2 and an area between the left obstacles L2 and L3 is not a parking area PA where the vehicle X can be parked, and an area between the right obstacles R1 and R3 is a parking area PA where the vehicle X can be parked, thereby judging that the parking area PA is located on the right side of the vehicle X.

The parking control unit 110 may judge that parallel parking is possible from the fact that the determined size (for example, an entrance width W13' is more than a predetermined value (for example: a vehicle width (2.3 M)) of the determined parking area PA and less than another predetermined value (for example, a vehicle length (4.5 M)).

Through the above-described process, the parking control unit 110 finally determines the right right-angle parking mode as the parking mode.

Unlike FIG. 7, if the right obstacle R3 is not present, a parking area in the right area may be confirmed to be wider than that of FIG. 7, in which case the judged parking area PA may be an area where one vehicle can be parked in parallel, or if the right obstacle R1 is a vehicle parked at a right angle, the judged parking area PA may be an area where two vehicles can be parked at a right angle.

Thus, in order to accurately classify them, a right image photographed through the camera 133 may be analyzed to recognize types and states of the right obstacle, and it may be determined that the right obstacle R1 is a vehicle parked at a right angle. Accordingly, the judged parking area PA may be classified as an area where two vehicles can be parked at a right angle.

Figure 8:
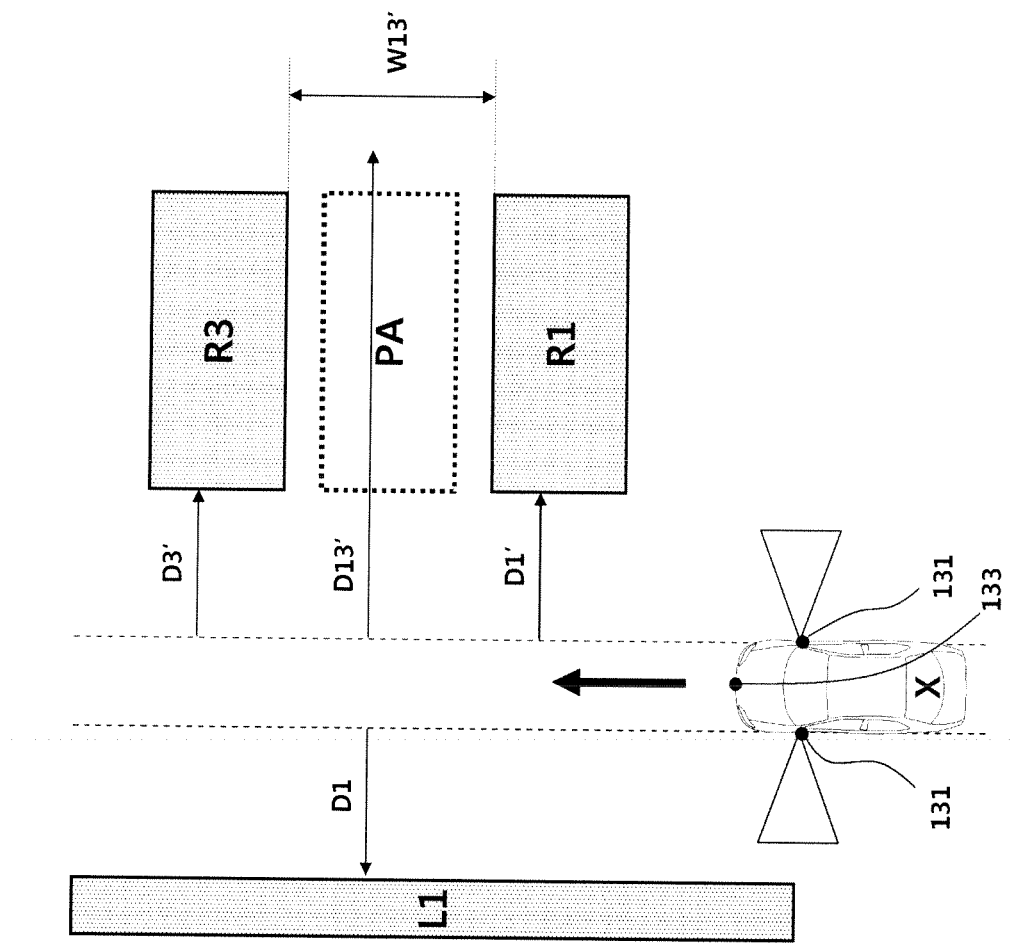
FIG. 8 is another exemplary view illustrating that the parking control apparatus according to the embodiment of the present invention determines a parking mode.

FIG. 8 is another exemplary view illustrating that the parking control apparatus 110 according to the embodiment of the present invention determines a parking mode.

FIG. 8 is the same as FIG. 7 except that the left obstacle L1 is a wall. Even in this case, as a distance value from the left obstacle L1 is constant as D1, it is judged that a parking area is not present in the left area, and an area between the right obstacles R1 and R3 in the right area is determined to be a parking area PA.

Hereinafter, a parking control method provided by the above-described parking control unit 110 will be described briefly.

Figure 9:
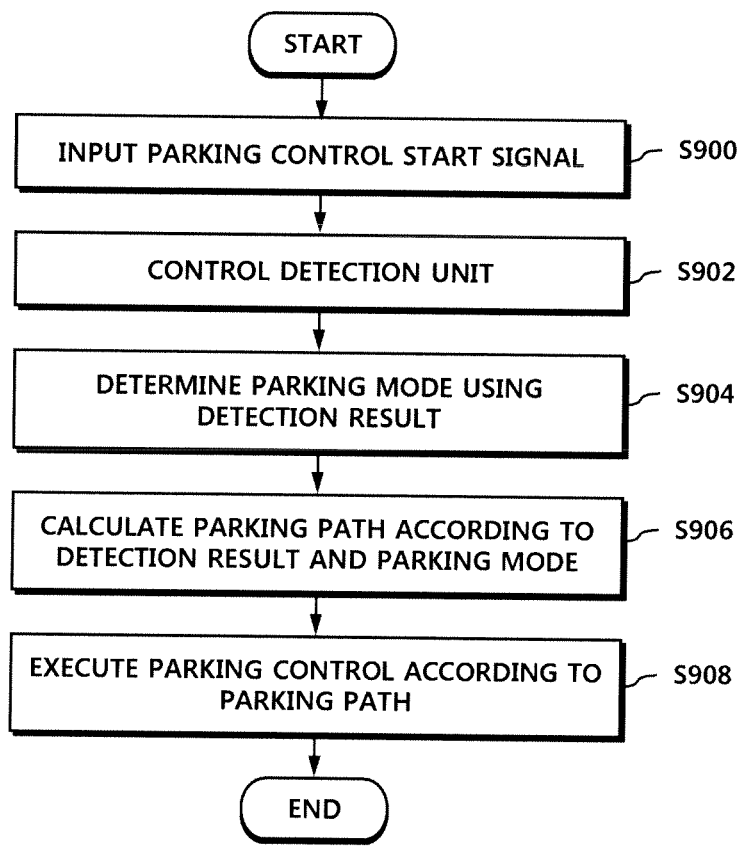
FIG. 9 is a flowchart illustrating a parking control method according to an embodiment of the present invention.

FIG. 9 is a flowchart illustrating a parking control method according to an embodiment of the present invention.

Referring to FIG. 9, the parking control method according to the embodiment of the present invention includes: receiving a parking control start signal through a parking control switch 120 (S900); controlling such that, if the parking control start signal is input, while a vehicle is moving, a left area and a right area are detected through a left ultrasonic sensor 131 and a right ultrasonic sensor 132 and a left image for the left area and a right image for the right area are photographed through at least one camera 133 (S902); and judging whether an available parking area is located on the left or right side of the vehicle and whether the vehicle is to be parked at a right angle or in parallel based on left ultrasonic data and the left image for the left area and right ultrasonic data and the right image for the right area, and determining a parking mode for parking the vehicle in the parking area according to the judging result (S904).

After the above-described step S904, the parking control method may further include calculating a parking path for moving and parking the vehicle in the parking area according to the determined parking mode, based on information obtained by analyzing ultrasonic data input through the ultrasonic sensors 131 and 132 and information obtained by analyzing an image photographed through the camera 133 (S906), and outputting a vehicle control instruction for moving the vehicle along the calculated parking path to actually execute a parking control (S908).

Figure 10:
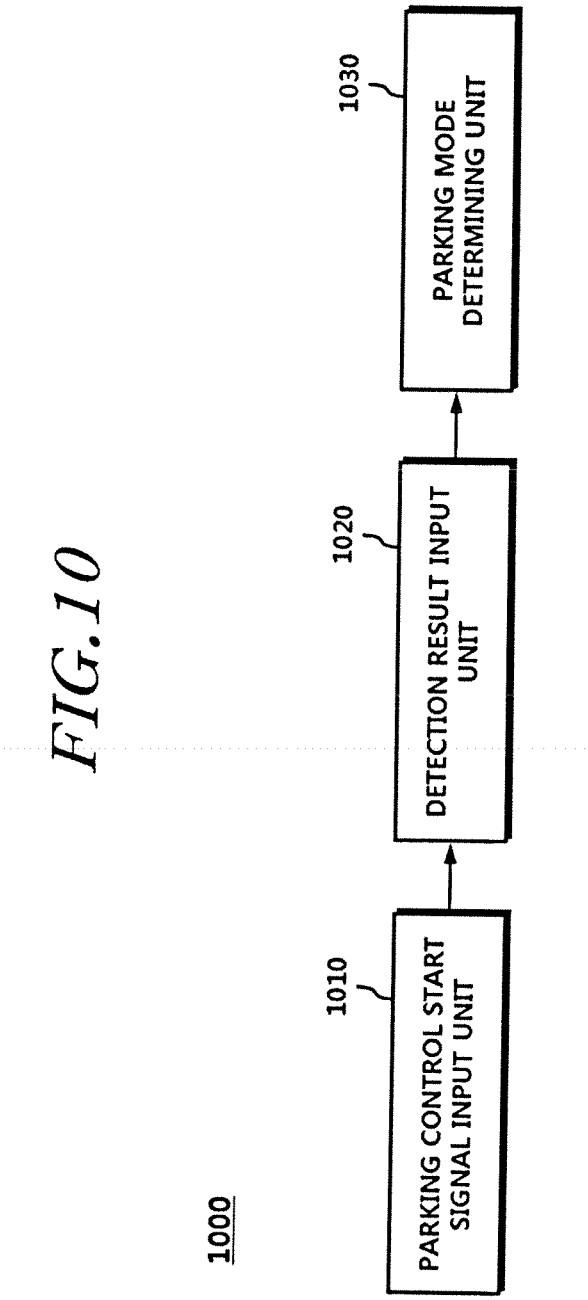
FIG. 10 is a block diagram illustrating a parking control apparatus according to another embodiment of the present invention.

FIG. 10 is a block diagram illustrating a parking control apparatus according to another embodiment of the present invention.

Referring to FIG. 10, the parking control apparatus 1000 according to another embodiment of the present invention includes a parking control start signal input unit 1010 for receiving a parking control start signal through a parking control switch; a detection result input unit 1020 for receiving a detection result detected for a peripheral area of the vehicle through a plurality of detection units; and a parking mode determining unit 1030 for judging whether an available parking area is located on the left or right side of the vehicle based on the input detection result and whether the vehicle is to be parked in the parking area at a right angle or in parallel, and determining a parking mode for parking the vehicle in the parking area according to the judging result.

The plurality of detection units may include two or more ultrasonic sensors, and may additionally include one or more cameras.

As described above, the present invention can detect a peripheral situation to automatically determine a parking mode only if a driver presses a parking control switch for starting a parking control once, thereby eliminating a parking mode selection switch and solving an inconvenience of manipulation for selection of a parking mode by the driver.

Further, the present invention can overcome restrictions of ultrasonic sensors by additionally using a camera in addition to the ultrasonic sensors, thereby allowing obstacles to be recognized more accurately and performing a parking control more safely and accurately.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as an independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A parking control apparatus comprising:
a parking control start signal input unit for receiving a parking control start signal through a parking control switch;
a detection control unit for controlling such that, if the parking control start signal is input, while a vehicle is moving, a left area and a right area are detected through a left ultrasonic sensor and a right ultrasonic sensor and a left image for the left area and a right image for the right area are photographed through at least one camera;
a parking mode determining unit for determining whether an available parking area is located on a left or right side of the vehicle and whether the vehicle is to be parked at a right angle or in parallel based on left ultrasonic data and the left image for the left area and right ultrasonic data and the right image for the right area, and determining a parking mode for parking the vehicle in the parking area according to the determination result;
a parking path calculating unit for calculating a parking path along which the vehicle is moved to be parked, according to the determined parking mode; and
a vehicle control instruction output unit for outputting a vehicle control instruction for controlling and automatically moving the vehicle to the parking area along the parking path,
wherein the parking mode determining unit acquires information on a distance between the vehicle and an obstacle in the left area from the left ultrasonic data and recognizes existence of the obstacle in the left area and a type of the obstacle through an image analysis of the left image to determine whether the parking area is located on the left side of the vehicle, and acquires information on a distance between the vehicle and an obstacle in the right area from the right ultrasonic data and recognizes existence of the obstacle in the right area and a type of the obstacle through an image analysis of the right image to determine whether the parking area is located on the right side of the vehicle, and if it is determined that parking areas are located on both left and right sides of the vehicle, after a size of the parking area located on the left side is calculated from a distance between the obstacles through the left ultrasonic data and a size of a parking area located on the right side is calculated from a distance between the obstacles through the right ultrasonic data, the size of the parking area located on the left side and the size of the parking area located on the right side are compared with each other to determine the larger parking area as a parking area.

2. The parking control apparatus as claimed in claim 1, wherein the parking mode determining unit, if determining the parking area is located on the left side of the vehicle, acquires information on the size of the parking area from the left ultrasonic data and recognizes the existence of the obstacle in the left area, the type of the obstacle, and a state of the obstacle through the image analysis of the left image to determine whether the vehicle is to be parked at the right angle or in parallel in the parking area, and if the parking area is located on the right side of the vehicle, acquires information on the size of the parking area from the right ultrasonic data and recognizes the existence of the obstacle in the right area, the type of the obstacle, and a state of the obstacle through the image analysis of the right image to determine whether the vehicle is to be parked at the right angle or in parallel in the parking area.

3. The parking control apparatus as claimed in claim 2, wherein during the image analysis of the left image and the right image, the parking mode determining unit sets a region of interest (ROI) having a predetermined size in the corresponding image, extracts an edge component from an image corresponding to the set ROI, acquires obstacle contour information based on the extracted edge component, and recognizes existence of an obstacle, a type of the obstacle, and a state of the obstacle based on the acquired obstacle contour information.

4. The parking control apparatus as claimed in claim 3, wherein the parking mode determining unit compares various obstacle shape information stored in advance with the acquired obstacle contour information through a learning algorithm to recognize at least one of the existence of the obstacle, the type of the obstacle, and the state of the obstacle.

5. The parking control apparatus as claimed in claim 1, wherein the parking mode determining unit, if the parking area is determined to be located on the left side of the vehicle and the vehicle is to be parked at the right angle in the parking area, determines a left right-angle parking mode as the parking mode, if the parking area is determined to be located on the right side of the vehicle and the vehicle is to be parked at the right angle in the parking area, determines a right right-angle parking mode as the parking mode, if the parking area is determined to be located on the left side of the vehicle and the vehicle is to be parked in parallel in the parking area, determines a left parallel parking mode as the parking mode, and if the parking area is determined to be located on the right side of the vehicle and the vehicle is to be parked in parallel in the parking area, determines a right parallel parking mode as the parking mode.

6. A parking control method provided by a parking control apparatus, the parking control method comprising:
receiving a parking control start signal through a parking control switch;
controlling such that, if the parking control start signal is input, when a vehicle moves, a left area and a right area are detected through a left ultrasonic sensor and a right ultrasonic sensor and a left image for the left area and a right image for the right area are photographed through at least one camera; and
determining whether an available parking area is located on a left or right side of the vehicle and whether the vehicle is to be parked at a right angle or in parallel based on left ultrasonic data and the left image for the left area and right ultrasonic data and the right image for the right area, and determining a parking mode for parking the vehicle in the parking area according to the determination result,
wherein if it is determined that parking areas are located on both the left and right sides of the vehicle, after a size of a parking area located on the left side is calculated from a distance between obstacles through the left ultrasonic data and a size of a parking area located on the right side is calculated from a distance between obstacles through the right ultrasonic data, the size of the parking area located on the left side and the size of the parking area located on the right side are compared with each other to determine the larger parking area as a parking area, and
wherein the vehicle is controlled to automatically move along a parking path to be parked in the larger parking area.

7. A parking control system comprising:
a parking control switch for receiving a parking control start signal;
a plurality of detection units for detecting a periphery of the vehicle when the vehicle moves according to an input of the parking control start signal; and
a parking control unit for determining whether an available parking area is located on a left or right side of the vehicle and whether the vehicle is to be parked at a right angle or in parallel in the parking area based on detection results input from the plurality of detection units, determining a parking mode for parking the vehicle in the parking area according to the determination result, and performing a parking control such that the vehicle moves to park in the parking area according to the determined parking mode,
wherein if it is determined that parking areas are located on both left and right sides of the vehicle, after a size of a parking area located on the left side is calculated from a distance between obstacles through the left ultrasonic data and a size of a parking area located on the right side is calculated from a distance between obstacles through the right ultrasonic data, the size of the parking area located on the left side and the size of the parking area located on the right side are compared with each other to determine the larger parking area as a parking area, and
wherein the vehicle is controlled to automatically move along a parking path to be parked in the larger parking area.

8. A parking control apparatus comprising:
a parking control start signal input unit for receiving a parking control start signal through a parking control switch;
a detection result input unit receiving a detection result detected for a peripheral area of a vehicle through a plurality of detection units; and
a parking mode determining unit for determining whether an available parking area is located on a left or right side of the vehicle and whether the vehicle is to be parked at a right angle or in parallel in the parking area based on the detection results of the detection result input unit, and determining a parking mode for parking the vehicle in the parking area according to the determination result,
wherein the parking mode determining unit acquires information on a distance between the vehicle and an obstacle in the left area from the left ultrasonic data and recognizes existence of the obstacle in the left area and a type of the obstacle through an image analysis of the left image to determine whether the parking area is located on the left side of the vehicle, and acquires information on a distance between the vehicle and an obstacle in the right area from the right ultrasonic data and recognizes existence of the obstacle in the right area and a type of the obstacle through an image analysis of the right image to determine whether the parking area is located on the right side of the vehicle, and if it is determined that parking areas are located on both left and right sides of the vehicle, after a size of a parking area located on the left side is calculated from a distance between the obstacles through the left ultrasonic data and a size of a parking area located on the right side is calculated from a distance between obstacles through the right ultrasonic data, the size of the parking area located on the left side and the size of the parking area located on the right side are compared with each other to determine the larger parking area as a parking area, and
wherein the vehicle is controlled to automatically move along a parking path to be parked in the larger parking area.

* * * * *